United States Patent
Yasuda et al.

(10) Patent No.: US 12,172,416 B2
(45) Date of Patent: Dec. 24, 2024

(54) SLIDING MEMBER AND METHOD FOR PRODUCING SAME

(71) Applicant: DAIDO METAL COMPANY LTD., Nagoya (JP)

(72) Inventors: Erina Yasuda, Inuyama (JP); Shigeru Inami, Inuyama (JP); Yuma Haneda, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 510 days.

(21) Appl. No.: 17/512,957

(22) Filed: Oct. 28, 2021

(65) Prior Publication Data
US 2022/0176673 A1 Jun. 9, 2022

(30) Foreign Application Priority Data
Dec. 9, 2020 (JP) .................................. 2020-204627

(51) Int. Cl.
*B32B 3/26* (2006.01)
*B32B 15/08* (2006.01)
(Continued)

(52) U.S. Cl.
CPC .............. *B32B 3/263* (2013.01); *B32B 15/08* (2013.01); *B32B 37/182* (2013.01); *B32B 38/0012* (2013.01)

(58) Field of Classification Search
None
See application file for complete search history.

(56) References Cited

U.S. PATENT DOCUMENTS 5,433,531 A * 7/1995 Thompson ............ C23C 24/045
384/282
6,334,914 B2 * 1/2002 Sakai ........................ C22C 9/02
428/545
(Continued)

FOREIGN PATENT DOCUMENTS

DE 112018000070 T5 3/2019
JP 2003-156045 A 5/2003
(Continued)

OTHER PUBLICATIONS

Extended European Search Report issued in corresponding European Application No. 21205541.2 mailed on Apr. 20, 2022, 9 pages.

*Primary Examiner* — Seth Dumbris
(74) *Attorney, Agent, or Firm* — Snyder, Clark, Lesch & Chung, LLP

(57) ABSTRACT

A sliding member including: a soft metal layer formed by stacking a crystal of soft metal, in which a coarse crystal is exposed on a surface of the soft metal layer, the coarse crystal has a particle length of 1.5 µm or more in a plane direction of the surface, and a distribution proportion of the coarse crystal is 5 to 50%, wherein the distribution proportion is a proportion of a circumscribed rectangle in a unit length of a virtual straight line, the circumscribed rectangle is applied to the coarse crystal appearing in a cross section of the soft metal layer, and the virtual straight line passing through the circumscribed rectangles in the cross section and parallel to a surface reference line of the soft metal layer is formed, an upper side of the circumscribed rectangle is parallel to the surface reference line of the soft metal layer, and the surface reference line is an average height of the surface of the soft metal layer appearing in the cross section.

5 Claims, 2 Drawing Sheets

(51) Int. Cl.
    *B32B 37/18*     (2006.01)
    *B32B 38/00*     (2006.01)

(56) References Cited

U.S. PATENT DOCUMENTS

| | | |
|---|---|---|
| 10,100,874 B2 | 10/2018 | Wada |
| 2012/0282481 A1* | 11/2012 | Yasui .................... F16C 33/121 |
| | | 428/323 |
| 2015/0300408 A1* | 10/2015 | Thumm .................. C23C 30/00 |
| | | 508/103 |
| 2016/0201719 A1* | 7/2016 | Gorges ................... G01K 11/16 |
| | | 116/216 |
| 2018/0258993 A1 | 9/2018 | Wada |
| 2019/0237887 A1* | 8/2019 | Kato ........................ C25D 5/10 |

FOREIGN PATENT DOCUMENTS

| | | |
|---|---|---|
| JP | 2009264441 A | 11/2009 |
| JP | 2013204810 A | 10/2013 |
| JP | 2014081040 A | 5/2014 |
| WO | 2017094094 A1 | 6/2017 |

\* cited by examiner

SLIDING MEMBER AND METHOD FOR PRODUCING SAME

FIELD OF THE INVENTION

The present invention relates to an improvement of a sliding member and a method for producing the sliding member.

DESCRIPTION OF RELATED ART

The sliding member generally includes a base material layer and a surface layer, and a slid member is supported by the surface layer. All or a part of the surface layer may be formed by plating using a soft metal material.

In such a sliding member, patent document 1 proposes, as a material constituting a soft metal layer, a material in which crystal grains of a soft material having a grain diameter of 0.1 μm to 1 μm are aggregated in a mass.

A plating layer having fine crystal grains is also disclosed in patent document 2.

CITATION LIST

Patent Documents

Patent document 1 WO 2017/094094 A
Patent document 2 JP 2003-156045 A

SUMMARY OF INVENTION

As disclosed in the patent document 1, when a plating layer containing fine crystal grains having a certain level of fineness is used as a soft metal layer, the surface thereof as a sliding surface has improved coating strength due to the Hall-Petch relationship, and high fatigue resistance.

In recent years, automobile engines have been developed into low fuel consumption engines such as a hybrid system, an idling stop system, and weight reduction of the engine by downsizing due to increased awareness of environmental problems and legal regulations. Along with downsizing of an engine using a turbocharger, the engine is downsized while securing power performance equivalent to that of a conventional engine, so that a shaft diameter and a metal width are reduced. For this reason, a bearing for an automobile engine tends to be used in a severe environment as compared with the related art due to an increase in load as compared with the related art, so that, to the bearing, not only improvement in fatigue resistance and seizure resistance but also low friction characteristics are required.

Solutions to Problems

As one measure for securing low friction characteristics, it is conceivable to form an oil film at the interface between the sliding surface and the slid surface. The present inventors have studied that when a surface of a soft metal layer is used as the sliding surface, an oil reservoir is provided on the surface to avoid loss of the oil film at the interface between the sliding surface and the slid surface, thereby securing a low friction state between both surfaces.

Therefore, in the present invention, it has been considered that when the surface of the soft metal layer is used as a sliding surface, a part of the crystals exposed on the surface thereof is formed into large crystals (coarse crystals), and the coarse crystals are detached from the surface to thereby form an oil reservoir at the sites where the coarse crystals are detached.

A first aspect of the present invention is defined as follows. That is, a sliding member including a soft metal layer formed by stacking a crystal of soft metal, in which a coarse crystal is exposed on a surface of the soft metal layer, the coarse crystal has a particle length of 1.5 μm or more in a plane direction of the surface, and a distribution proportion of the coarse crystal is 5 to 50%.

Here, the distribution proportion refers to the proportion of a circumscribed rectangle in a unit length of a virtual straight line, wherein the circumscribed rectangle is applied to the coarse crystal appearing in a cross section of the soft metal layer, wherein the virtual straight line passing through all the circumscribed rectangles in the cross section and parallel to a surface reference line of the soft metal layer is formed, wherein the upper side of the circumscribed rectangle is parallel to the surface reference line of the soft metal layer, and wherein the surface reference line is an average height of the surface of the soft metal layer appearing in the cross section.

According to the sliding member defined as described above, coarse crystals are exposed on the surface of the soft metal layer, and thus the coarse crystals are separated and detached from the surface which is the sliding surface as time passes. Recesses formed on the sites serve as an oil reservoir of the lubricant oil.

In order for the recesses to effectively function as an oil reservoir, a certain volume is required for each recess. It is also necessary to control the proportion of the recess in the entire surface of the soft metal layer as the sliding surface.

Therefore, as shown in the first aspect, the coarse crystal is assumed to have a particle length of 1.5 μm or more in the plane direction of the surface of the soft metal layer, so that a volume necessary as an oil reservoir is secured in recesses formed in sites where the coarse crystals are detached. According to the study by the present inventors, coarse crystals have a certain degree of grain diameter also in the direction perpendicular to the surface of the soft metal layer. Therefore, by defining the grain diameter in the plane direction of the surface, a volume required as an oil reservoir can be secured in recesses formed after the detachment.

In the case of a crystal having a particle length of less than 1.5 μm in the plane direction of the surface, not only the volume of the subsequent recess becomes insufficient, but also crystals are hardly detached from the surface, and there is a possibility that recesses serving as an oil reservoir are not formed.

As shown in the first aspect, by setting the distribution proportion of the coarse crystals to 5 to 50%, a sufficient amount of recesses are secured on the surface of the soft metal layer after detachment of the coarse crystals. Accordingly, a sufficient amount of lubricant oil can be retained in the entire recess.

When the distribution proportion of the coarse crystals is less than 5%, there is a possibility that sufficient lubricant oil cannot be retained between the surface (sliding surface) of the soft metal layer and the slid surface of the slid member. On the other hand, when the proportion exceeds 50%, the smoothness of the surface (sliding surface) itself of the soft metal layer is impaired, and the friction coefficient may increase.

That is, a second aspect of the present invention is defined as follows. That is, in the sliding member according to the first aspect, the distribution proportion of the coarse crystals is 15 to 45%.

According to the sliding member of the second aspect defined as above, low friction characteristics are secured.

That is, a third aspect of the present invention is defined as follows. That is, in the sliding member according to the first or second aspect, all of the coarse crystals are exposed on the surface of the soft metal layer.

According to the sliding member of the third aspect defined as above, all the coarse crystals are exposed on the surface of the soft metal layer, and thus the coarse crystals are detached to form an oil reservoir.

That is, a fourth aspect of the present invention is defined as follows. That is, in the sliding member according to any one of the first to third aspects, a distance from a center of gravity of a circumscribed rectangle of the coarse crystal appearing in a vertical cross section of a surface of the soft metal layer and having a maximum length in a thickness direction (hereinafter, referred to as "length in the thickness direction) of the soft metal layer to the surface reference line is 25% or less of a thickness of the soft metal layer.

In the fourth aspect, the embedding mode (degree of embedding) of a coarse crystal having a maximum length in the thickness direction among the coarse crystals, viewed from the surface of the soft metal layer is defined. That is, when the length ratio of the distance from the surface of the soft metal layer to the center of gravity of a coarse crystal having the maximum length in the thickness direction to the thickness of the soft metal layer is 25% or less, it is indicated that the coarse crystals are not deeply embedded from the surface of the soft metal layer. This indicates that the coarse crystals can be naturally detached from the surface.

On the other hand, when the length ratio exceeds 25%, coarse crystals are hardly detached from the surface.

That is, a fifth aspect of the present invention is defined as follows. That is, in the sliding member according to any one of the first to fourth aspects, the soft metal is one or more selected from bismuth (Bi), lead (Pb), indium (In), tin (Sn), and antimony (Sb), or an alloy thereof.

The soft metals listed in the fifth aspect are considered to be optimal as those constituting the soft metal layer of the sliding member from an industrial viewpoint.

That is, a sixth aspect of the present invention is defined as follows. That is, in the sliding member according to any one of the first to fifth aspects, a resin layer is further laminated on the soft metal layer.

According to the sliding member of the sixth aspect defined as above, it is possible to improve characteristics such as seizure resistance by selecting the resin constituting the resin layer.

Even in a case where the resin layer is laminated on the surface of the soft metal layer, if coarse crystals are disposed on the surface of the soft metal layer, it is possible to prevent the friction coefficient from increasing more than an allowable level. This is because even if the resin layer is partially or entirely abraded to expose the surface of the soft metal layer, coarse crystals in the exposed portion are detached to form an oil reservoir therein.

That is, a seventh aspect of the present invention is defined as follows. That is, a process for producing a sliding member including a soft metal layer, the method including:
a step of laminating a crystal of soft metal on a surface of a base material to form a precursor layer; and
a coarse crystal forming step of transforming a part of the crystal constituting a surface of the precursor layer to form a coarse crystal, thereby obtaining the soft metal layer.

The process of the seventh aspect can also be defined as follows. That is, a method for producing a sliding member including a soft metal layer, the method including: a step of laminating a columnar crystal of soft metal on a surface of a base material to form a precursor layer; and
a coarse crystal forming step of applying stress to a surface of the precursor layer to transform a part of the columnar crystal to form a coarse crystal, thereby obtaining the soft metal layer.

By carrying out the process according to the seventh aspect or the eighth aspect as defined above, the sliding member defined in the first to sixth aspects can be produced.

As the coarse crystal forming step according to the seventh and eighth aspects, a method can be employed in which a surface of the precursor layer which is a crystal laminate of a soft metal is subjected to shot blasting while being cooled (ninth aspect). It is possible to adopt wet blasting in which a shot material is ejected together with water as shot blasting with cooling (tenth aspect).

DETAILED DESCRIPTION OF PREFERRED EMBODIMENTS

Figure 1:
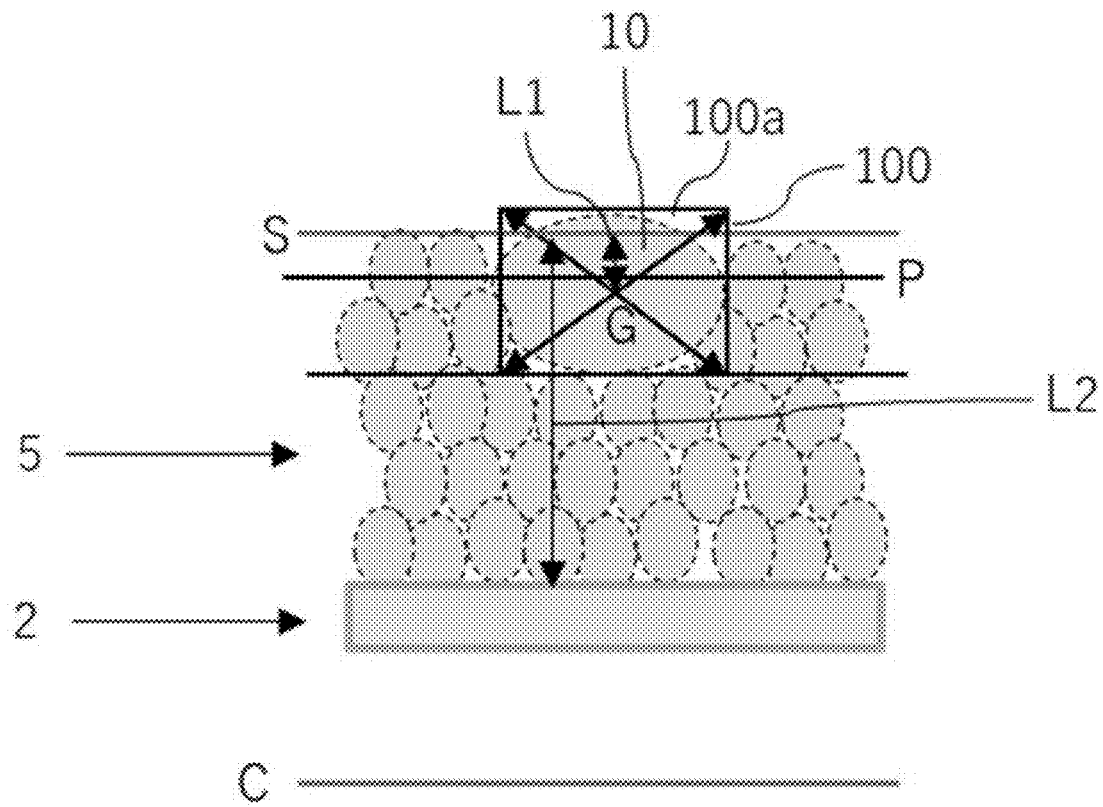
FIG. 1 is a conceptual view illustrating parameters of a coarse crystal.

Hereinafter, the present invention will be described in more detail based on embodiments.

The base material layer constituting the sliding member is generally made of a metal material.

In the bearing as an example of the sliding member, the base material layer has a configuration in which a copper-based bearing alloy layer is laminated on a back metal layer made of a steel material. An intermediate layer made of Ag, Ni, or the like may be formed on the bearing alloy layer.

A soft metal layer is laminated on the base material layer. The soft metal layer is generally formed by plating, but is not limited to plating.

As the soft metal, one or more selected from indium (In), tin (Sn), lead (Pb), bismuth (Bi), and antimony (Sb), or an alloy thereof can be used.

As a plating method, wet electrolytic plating can be used, but it does not hinder the adoption of other plating methods.

When the base material layer is plated with these soft metals, the sizes of crystals constituting the formed plating layer fall within a size of a predetermined range.

In the present invention, a layer that is formed by plating and is not subjected to a coarse crystal formation treatment described later is referred to as a precursor layer.

The crystal grain diameter of the soft metal crystal constituting the precursor layer is preferably 1.4 μm or less.

The crystal grain diameter is defined by subjecting the vertical cross section of the precursor layer to image processing by a section method. Here, in the section method, the crystal grain diameter of the crystal grain was determined by dividing the length of the circumference by the number of crystal grains passing through the circumference formed on the observation image. In the present invention, the diameter was calculated from the circumferential length of 2 μm in diameter.

By adjusting the plating conditions, the structure of the crystal constituting the precursor layer becomes columnar.

The major axis of the columnar crystal is perpendicular to the surface of the precursor layer.

When the surface of the precursor layer is subjected to wet blasting, crystals of the surface layer of the precursor layer were transformed to form coarse crystals. Here, the coarse crystals are presumed to be formed by aggregation and fusing of a part of crystals constituting the precursor layer. In the present invention, a precursor layer in which coarse crystals are formed on the surface thereof is referred to as a soft metal layer.

The coarse crystal is a crystal larger than the crystal constituting the precursor layer.

Such coarse crystals are detached from the soft metal layer as the use of the sliding member, that is, sliding with the slid member progresses. The recesses remaining on sites where the coarse crystals are detached serve as the oil reservoir of the lubricant oil.

In order for such recesses to effectively act as the oil reservoir, each recess needs to have a predetermined volume and be distributed at a certain proportion on the surface of the soft metal layer. In the sliding member of the present invention, coarse crystals present on the surface of the soft metal layer in the default state (shipment state) are detached with the use of the sliding member to form recesses of the oil reservoir. Thus, the surface state of the soft metal layer in the use state is indirectly defined by defining the size and distribution proportion of the coarse crystals in the default state.

Size of Coarse Crystal

A coarse crystal 10 has a particle length of 1.5 μm or more in the plane direction of the surface (see FIG. 1).

As shown in FIG. 1, the particle length of the coarse crystal 10 is defined as the length of an upper side 100a of a circumscribed rectangle 100 applied to the crystal particle in the cross section of the sliding member. The upper side 100a of the circumscribed rectangle 100 is parallel to a surface reference line S of a soft metal layer 5. Here, the surface reference line S is the average height of the surface of the soft metal layer 5 appearing in the cross section. Since crystals of various sizes are exposed on the surface of the soft metal layer 5, the surface is microscopically an uneven surface. Thus, in the present invention, the average of the heights of the unevennesses (the distance from the central axis C in the cylindrical sliding member) is defined as the surface reference line S. The surface reference line S is parallel to the central axis C in the cylindrical sliding member.

The surface of soft metal layer 5 in the vertical direction preferably has the following characteristics.

That is, a distance L1 from a center of gravity G of the coarse crystal 10 appearing in the vertical cross section of the surface of the soft metal layer 5 and having the maximum length in the depth direction to the surface reference line S is 25% or less of a thickness L2 of the soft metal layer 5. In FIG. 1, reference numeral 2 denotes a base material layer. Since the surface of a base material layer 2 is also microscopically not flat, the surface position of the base layer 2 can be specified with an average height similarly to the soft metal layer 5. The thickness of the soft metal layer 5 can be set with a distance between the surface determined in this manner and the surface reference line S.

The coarse crystal 10 does not creep to a depth of more than ¼ from the surface reference line S in the soft metal layer 5. As a result, the coarse crystal 10 can be detached from the surface of the soft metal layer 5.

In the general-purpose sliding body, since the thickness of the soft metal layer 5 is 3 to 20 μm, the length in the depth direction of the coarse crystal 10 having the maximum length in the depth direction falls within 0.5 to 10.0 μm.

Distribution Proportion of Coarse Crystals

The distribution proportion of the coarse crystals 10 is 5 to 50%. The distribution proportion of the coarse crystals 10 was determined as follows.

The circumscribed rectangle 100 is applied to the coarse crystal 10 appearing in the cross section of the soft metal layer 5. At this time, the upper side 100a of the circumscribed rectangle 100 is parallel to the surface reference line S of the soft metal layer 5. A virtual straight line P passing through all the circumscribed rectangles 100 and parallel to the surface reference line S in the cross section is formed. The distribution proportion of the coarse crystals refers to the proportion of the circumscribed rectangles in the unit length of the virtual straight line P. Here, the surface reference line S is the average height of the surface of the soft metal layer 5 appearing in the cross section.

The coarse crystal 10 is exposed on the surface of the soft metal layer 5. Since the coarse crystal 10 is in the form of a particle, a part of the coarse crystal 10 is exposed on the surface, and there are various modes of appearance. From the viewpoint of retaining the lubricant oil on the surface of the soft metal layer, the proportion substantially occupied by the recesses serving as the oil reservoir in the surface is to be determined. In the present invention, the proportion substantially occupied by the recesses serving as the oil reservoir in the surface is defined as the distribution proportion of the coarse crystals. This is because the sites where the coarse crystals 10 are detached become recesses serving as the oil reservoir. By setting the distribution proportion of the coarse crystals to 5 to 50%, sufficient lubricant oil can be retained at the interface between the surface of the soft metal layer and the slid surface.

The distribution proportion of the coarse crystals is more preferably 15 to 45%.

The coarse crystal 10 was obtained by subjecting the surface of the precursor layer formed by plating to wet blasting.

When the precursor layer is subjected to general blasting, crystals of the precursor layer are entirely refined. In addition, the study of the present inventors, it is found that the grain diameter of the coarse crystal 10 also changes when the wet blasting conditions are changed.

The shot material, water temperature, and shot pressure used for wet blasting can be optionally selected according to the material of the precursor layer.

For example, alumina, glass beads, and other general-purpose shot materials can be adopted as the shot material, and the size thereof may also be general-purpose.

In Examples, the temperature of water ejected together with the shot material is room temperature, but hot water or cooling water can also be used.

The shot pressure is appropriately adjusted according to the material of the selected precursor layer and the material and size of the shot material.

As described above, when the blasting treatment is performed on the surface of the precursor layer together with the refrigerant, in other words, while cooling, the size and distribution proportion of the coarse crystals to be formed can be controlled. Although water is used as the refrigerant in wet blasting, liquid such as oil or alcohol, or gas such as cold air or water vapor can also be used as the refrigerant.

In other words, it means that stress is applied to the surface of the precursor layer to transform a part of the crystal. It is also possible to apply stress to a part of the surface by heat or light.

Examples

Hereinafter, Examples of the present invention will be described.

Figure 2:
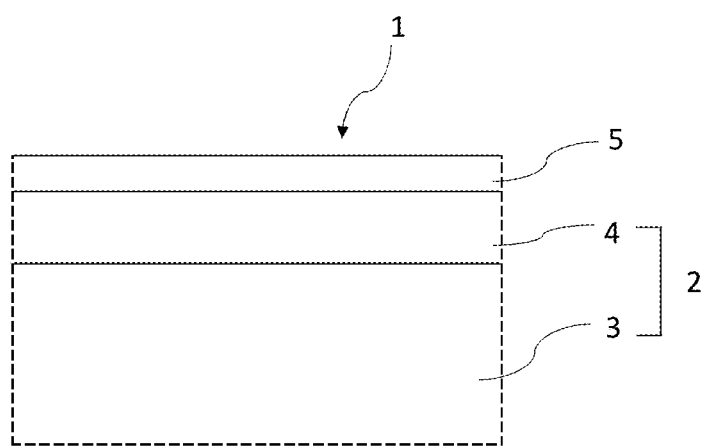
FIG. 2 is a cross-sectional view illustrating a configuration of a sliding member according to an embodiment of the present invention.

A sliding member 1 of Examples has, for example, a cross-sectional structure shown in FIG. 2. More specifically, a copper-based bearing alloy layer 4 was lined on a steel back metal layer 3 to produce a bimetal, and the bimetal was formed into a semi-cylindrical shape or a cylindrical shape. Thereafter, the surface of the bearing alloy layer 4 was subjected to boring to finish the surface. Thereby, the base material layer 2 (thickness: 1.5 mm) was formed. Next, the surface of the semi-cylindrical or cylindrical formed product was cleaned (electrolytic degreasing+acid cleaning).

The upper surface of the base material layer 2 thus obtained was subjected to wet plating to laminate a plating layer 5 (approximately 15 μm).

Figure 3:
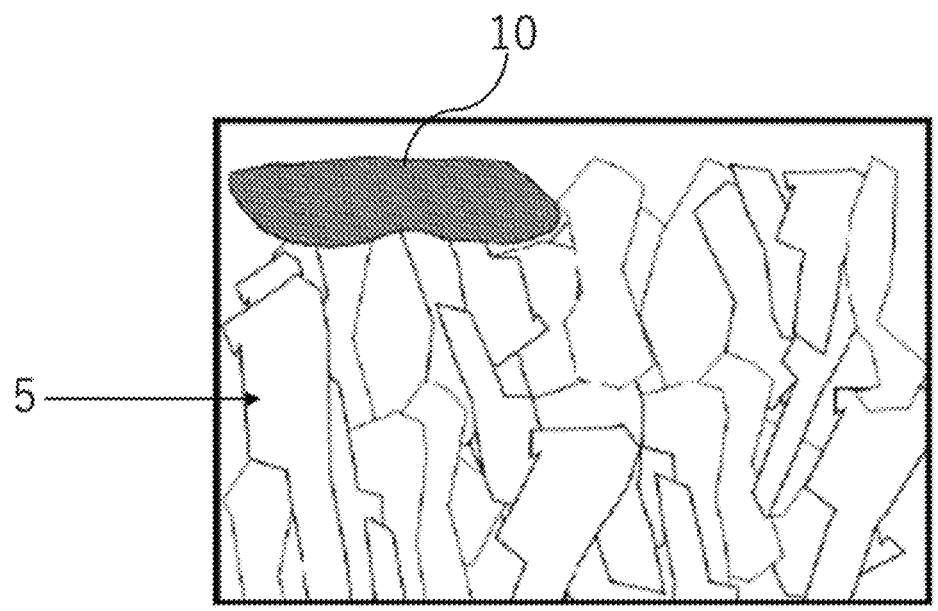
FIG. 3 is a view schematically illustrating a cross-sectional photograph of a soft metal layer in the same manner.

The plating conditions at the time of forming the plating layer 5 in the present Examples were adjusted so as to obtain the "crystal grain diameter of layers other than surface layer" in Table 1 described later. The crystal grain diameter is equal to the crystal grain diameter of the crystal constituting the precursor layer. Each crystal had a columnar structure (see FIG. 3).

Crystals having a desired crystal grain diameter can be obtained by adjusting the composition of the plating solution, the manner of stirring, the temperature, the current density, and the like. It can be understood by those skilled in the art that these specific conditions are not fixed and are appropriately selected based on the experience of the plating operator.

The precursor layer of each of the samples obtained as described above was cleaned by a well-known method.

Subsequently, the surface of the precursor layer was subjected to wet blasting.

Wet blasting conditions are as follows.
Shot material: alumina #2000 to 600, glass beads
Treatment pressure: 0.1 to 0.3 MPa
Water temperature: room temperature
The samples after completion of wet blasting are shown in Table 1.

5. In a lower portion of the soft metal layer 5, the influence of the wet blasting does not appear, and the crystals formed by plating remain as it is (columnar crystal). When the grain diameter of the crystal is calculated by the section method, the crystal grain diameter is 1.4 μm or less.

In Table 1, the "average of crystal grain diameters of layers other than surface layer" was obtained as follows.

The soft metal layer 5 is divided into five equal parts in the depth direction to obtain divided layers. A layer (surface layer) containing the coarse crystals 10 is removed from the obtained divided layers. Positions at predetermined intervals in the plane direction are designated in each layer other than the surface layer. The section method is performed at each of the positions to calculate the crystal grain diameter. The average value of the crystal grain diameters obtained at each position was taken as the "average of crystal grain diameters of layers other than surface layer". This average value indicates the average value of the crystal grain diameters of the precursor layer.

The "size of maximum coarse crystal" was obtained as follows.

In the coarse crystal 10 appearing in the cross section of the soft metal layer 5 obtained by cutting the sliding member along the axial direction, one having the maximum length of the upper side 100a of the circumscribed rectangle 100 was defined as "maximum coarse crystal", and the length thereof was expressed as "size".

The "distribution proportion of coarse crystals" was obtained as follows.

The circumscribed rectangle 100 is applied to the coarse crystal 10 appearing in the cross section of the soft metal layer 5. At this time, the upper side 100a of the circumscribed rectangle 100 is parallel to the surface reference line S of the soft metal layer 5. In the cross section, a virtual straight line P passing through the circumscribed rectangle and parallel to the surface reference line S was formed. The proportion of the circumscribed rectangles in the unit length of the virtual straight line P was taken as the distribution proportion of the coarse crystals. Note that the virtual

TABLE 1

| | Soft metal | Shot material | Particle No. | Shot pressure (MPa) | Average of crystal grain diameters of layers other than surface layer (μm) | Size of maximum coarse crystal (μm) | Distribution proportion of coarse crystals (%) | Friction coefficient after 5 hours |
|---|---|---|---|---|---|---|---|---|
| Example 1 | Bi | $Al_2O_3$ | 800 | 0.25 | 0.8 | 10.0 | 50 | 0.20 |
| Example 2 | Bi | $Al_2O_3$ | 1000 | 0.25 | 1.3 | 6.5 | 45 | 0.16 |
| Example 3 | Bi | $Al_2O_3$ | 1000 | 0.20 | 1.0 | 3.8 | 28 | 0.15 |
| Example 4 | Bi | $Al_2O_3$ | 1000 | 0.15 | 1.0 | 4.8 | 18 | 0.16 |
| Example 5 | Bi | $Al_2O_3$ | 2000 | 0.25 | 1.2 | 1.6 | 6 | 0.20 |
| Example 6 | Bi | Glass beads | 1500 | 0.25 | 0.5 | 5.0 | 26 | 0.15 |
| Example 7 | Pb | $Al_2O_3$ | 1000 | 0.25 | 0.8 | 4.4 | 29 | 0.16 |
| Comparative Example 1 | Bi | — | — | — | 1.0 | — | 0 | 0.30 |
| Comparative Example 2 | Bi | — | — | — | 5.0 | 10.0 | 100 | 0.35 |
| Comparative Example 3 | Bi | $Al_2O_3$ | 600 | 0.15 | 0.5 | 12.0 | 60 | 0.26 |

A schematic view of a cross section of a sample of Examples is as shown in FIG. 1.

In the drawing, reference numeral 10 denotes a coarse crystal, which is formed on the surface of the soft metal layer straight line P passes through the circumscribed rectangles of all the coarse crystals 10 appearing in the cross section. As the unit length of the virtual straight line P, the entire width of the obtained image can be used.

In Table 1, the "friction coefficient after 5 hours" was determined by performing a friction test under the conditions shown in Table 2.

TABLE 2

| Item | Conditions | Unit |
| --- | --- | --- |
| Bearing dimension | Φ56 × L15 × t1.5 | mm |
| Peripheral speed | 1.7 | m/s |
| Surface pressure | 4 | MPa |
| Test time | 5 | Hr |
| Operation mode | Start and stop | — |
| Lubricant oil | VG22 | — |
| Shaft material | S55C | — |

That is, the start and stop were repeated, and the friction coefficient after 5 hours was measured.

The following can be seen from the results of Table 1. It is assumed that a sample capable of maintaining the friction coefficient at 0.20 or less even after 5 hours is determined to be preferable in terms of low friction properties.

Even if the crystal grain diameters of the crystals of the precursor layer are the same, a large difference occurs in the low friction properties depending on the presence or absence of wet blasting, that is, the presence or absence of coarse crystals (see Examples 1 to 7 and Comparative Examples 1 and 2). As a result, from the results of Example 5 and Comparative Example 1 in which the energy of wet blasting is the lowest, it is considered that the size of the coarse crystal (length in the plane direction of the surface of the soft metal layer) is preferably 1.5 μm or more, and the distribution proportion of the coarse crystals (proportion of projected portion of coarse crystals appearing in a region having the same distance from the surface on the projection plane when the coarse crystals are projected on a surface side) is preferably 5% or more.

Even when wet blasting is performed, when coarse crystals are excessively formed and the distribution proportion of the coarse crystals exceeds 50% (see Example 1 and Comparative Example 3), the low friction properties are deteriorated.

In addition, from the comparison between Examples 1 and 5 and Examples 2 to 4, it is considered that the distribution proportion of the coarse crystals is preferably 15 to 45%.

As shown in Comparative Example 2, even when the crystal grain diameter of the crystal constituting the precursor layer of the soft metal layer formed by plating is large in the first place, it cannot be said that the low friction properties are excellent.

In Table 3, the thickness (length in the direction perpendicular to the surface) of the coarse crystal, which defines the depth of the recess of the oil reservoir to be formed on the surface of the soft metal layer, is verified.

TABLE 3

| | Soft metal | Shot material | Particle No. | Shot pressure (MPa) | Heat treatment temperature (° C.) | Average of crystal grain diameters of layers other than surface layer (μm) | Distribution proportion of coarse crystals (%) | Depth of center of gravity (%) | Friction coefficient after 5 hours |
| --- | --- | --- | --- | --- | --- | --- | --- | --- | --- |
| Example 8 | Bi | Al$_2$O$_3$ | 1000 | 0.20 | 200 | 1.0 | 28 | 31 | 0.15 |
| Example 9 | Bi | Al$_2$O$_3$ | 1000 | 0.20 | 180 | 1.0 | 31 | 24 | 0.12 |
| Example 10 | Bi | Al$_2$O$_3$ | 1000 | 0.20 | 160 | 0.5 | 29 | 13 | 0.13 |
| Example 11 | Bi | Al$_2$O$_3$ | 1000 | 0.20 | — | 0.6 | 28 | 2 | 0.13 |

In Table 3, the "depth of center of gravity" refers to the ratio of the distance L1 from the center of gravity G of the circumscribed rectangle 100 shown in FIG. 1 to the surface reference line S of the soft metal layer 5 to the thickness L2 of the soft metal layer 5.

As can be seen from the results in Table 3, when the wet blasting is performed and then the heat treatment is performed, the coarse crystals preferentially expand, and consequently, the position of the center of gravity becomes deep. From the comparison between Example 8 and Example 9, the depth of the center of gravity is preferably 25% or less.

The heat treatment here is performed by heating in an electric furnace for 10 to 60 minutes in the presence of air.

In the definition of Table 1, the maximum crystal is specified based on the length of the upper side of the circumscribed rectangle. According to the observation by the present inventors, in the circumscribed rectangle applied to the coarse crystal, one having the upper side of the maximum length also has the maximum length at the side (that is, in the depth direction of the soft metal layer 5).

In Table 4, the low friction properties when a resin layer (containing a solid lubricant) is laminated on the surface of the soft metal layer is verified.

TABLE 4

|  | Soft metal | Resin layer | Solid lubricant | Average of crystal grain diameters of layers other than surface layer (μm) | Distribution proportion of coarse crystals (%) | Friction coefficient after abrasion of resin layer |
|---|---|---|---|---|---|---|
| Example 12 | Bi | PAI | MoS$_2$ | 0.5 | 20 | 0.11 |
| Example 13 | Bi | PI | MoS$_2$ | 0.5 | 23 | 0.11 |
| Example 14 | Bi | PAI | Gr | 0.8 | 21 | 0.11 |
| Comparative Example 4 | Bi | PAI | MoS$_2$ | 1.0 | 3 | 0.23 |
| Comparative Example 5 | Bi | PAI | MoS$_2$ | 0.8 | 68 | 0.24 |

The samples in Table 4 were each obtained by laminating a resin layer on the soft metal layer 5 in the sliding member shown in FIG. 2. In the samples of Table 4, the thickness of the resin layer was 3 μm, but this resin layer can have a thickness of 2 to 20 μm. In Table 4, the friction coefficient after abrasion of the resin layer indicates the friction coefficient when a friction test was performed to visually observe and confirm that the resin layer was abraded and disappeared.

Even when the surface of the soft metal layer is covered with the resin layer, stress associated with sliding is applied to the surface of the soft metal layer, so that coarse crystals are detached to form recesses of the oil reservoir on the sites where coarse crystals are detached. If the size and distribution proportion of the recesses are suitable, even if the resin layer is abraded and disappeared, a smooth sliding state (low friction coefficient) is maintained between the sliding member and the slid member. This can be seen from the relationship between Examples 12 to 14 and Comparative Examples 4 and 5. In Examples 12 to 14, the distribution proportion of the coarse crystals falls within 5 to 50%, whereas in Comparative Examples 4 and 5, the distribution proportion is out of the range.

Example 14 shows that the above effect does not depend on the type of solid lubricant contained in the resin layer.

The present invention is not limited to the description of the embodiments of the invention. Various modifications that can be easily conceived by those skilled in the art without departing from the scope of the claims are also included in the present invention. A device using a bearing mechanism of an internal combustion engine or the like using the sliding member of the present invention exhibits excellent sliding characteristics.

What is claimed is:

1. A sliding member comprising:
a soft metal layer formed by stacking a crystal of soft metal, wherein
a coarse crystal is exposed on a surface of the soft metal layer, and is made of the soft metal,
the coarse crystal has a particle length of 1.5 μm or more in a plane direction of the surface, and
a distribution proportion of the coarse crystal is 5 to 50%,
wherein the distribution proportion is a proportion of a circumscribed rectangle in a unit length of a virtual straight line,
wherein the circumscribed rectangle is applied to the coarse crystal appearing in a cross section of the soft metal layer,
the virtual straight line passing through all the circumscribed rectangles in the cross section and parallel to a surface reference line of the soft metal layer is formed,
an upper side of the circumscribed rectangle is parallel to the surface reference line of the soft metal layer, and
the surface reference line is an average height of the surface of the soft metal layer appearing in the cross section, and
wherein a distance from a center of gravity of a circumscribed rectangle of the coarse crystal appearing in a vertical cross section of the surface and having a maximum length in a thickness direction of the soft metal layer to the surface reference line is 25% or less of a thickness of the soft metal layer.

2. The sliding member according to claim 1, wherein the distribution proportion of the coarse crystal is 15 to 45%.

3. The sliding member according to claim 1, wherein all the coarse crystals are exposed on the surface.

4. The sliding member according to claim 1, wherein the soft metal is one or more selected from bismuth (Bi), lead (Pb), indium (In), tin (Sn), and antimony (Sb), or an alloy thereof.

5. The sliding member according to claims 1, wherein a resin layer is further laminated on the surface of the soft metal layer.

* * * * *